Figure 1:
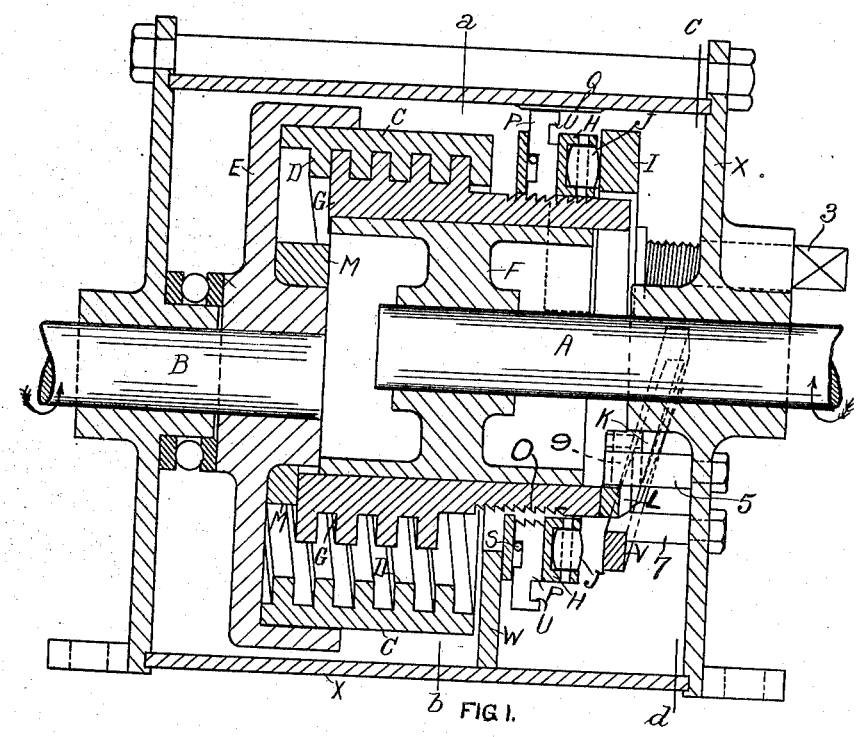

W. J. GEE.
VARIABLE SPEED GEAR AND CLUTCH.
APPLICATION FILED NOV. 13, 1917.

1,303,287.

Patented May 13, 1919.
2 SHEETS—SHEET 1.

Witnesses

Inventor
Wm J. Gee

W. J. GEE.
VARIABLE SPEED GEAR AND CLUTCH.
APPLICATION FILED NOV. 13, 1917.

1,303,287.

Patented May 13, 1919.
2 SHEETS—SHEET 2.

Witnesses   Inventor

UNITED STATES PATENT OFFICE.

WILLIAM JOHN GEE, OF LONDON, ENGLAND.

VARIABLE-SPEED GEAR AND CLUTCH.

1,303,287.

Specification of Letters Patent. Patented May 13, 1919.

Application filed November 13, 1917. Serial No. 201,859.

*To all whom it may concern:*

Be it known that I, WILLIAM JOHN GEE, a subject of the King of England, residing at 48 Kingsmead road, Tulse Hill, London, England, have invented new and useful Improvements in Variable-Speed Gears and Clutches, of which the following is a specification.

This invention relates to improvements in variable speed gear mechanism whereby the speed of the driven element of the gear is controlled in a positive manner, and is variable for all speeds between zero and the maximum speed that the ratio between the driven and driving elements provides for.

To attain this result the driving and the driven elements of the gear are provided with teeth having inclined or wedge-like surfaces.

The control of the speed of the driven element is obtained by allowing or causing a definite extent of slip of these wedge-like surfaces one on the other, for which purpose the teeth of one of the elements of the gear are movably mounted thereon. If a full slip is allowed no drive will be caused against a load, and if no slip is allowed there will be a full drive. Intermediate speeds are obtained by allowing the appropriate extent of slip.

After the engagement or meshing of a wedge has ceased, the wedge is restored to the correct position for reëngagement by suitable means.

A convenient arrangement for carrying out the invention is the following:

The driven element of the gear consists of a hollow cylinder open at one end and closed at the other. It is fixed to an axle at the closed end, so that the cylinder rotates around its longitudinal axis.

The inner periphery of the hollow cylinder has a thread or worm cut on it, of appropriate section. Preferably the thread is a multiple thread, so as to provide a considerable pitch or slope.

The driving element consists of a cylindrical boss of smaller diameter than the cylinder of the driven element, and rotating within it. This boss is also mounted on an axle so as to rotate around its longitudinal axis.

The boss of the driving element is provided with slots, dovetails or the like parallel with the longitudinal axis of the boss, and arranged equidistantly around the periphery. Within these dovetails slide teeth-carrying sections.

The teeth on these sections are essentially sections of a male thread which fit the female thread or worm on the inside of the cylinder of the driven element.

The axis of the driving element is set eccentrically to the axis of the driven element, so that one side of the boss is adapted to gear into the worm on the inside of the driven cylinder through the toothed sections, while on the opposite side the teeth are clear of the worm.

The ends of the sliding teeth-carrying sections which are near the open end of the driven cylinder are provided with thrust blocks or bosses which are adjustable as to their position as hereinafter described.

Carried at one end by the casing which surrounds or incloses the gear, or by a stationary framing is the control part of the gear. This consists of a guide curved to correspond to the circular path of the thrust blocks, and this guide may by suitable levers, cams or the like, be set, either that the face of it on which the thrust blocks slide is parallel with the plane of rotation, or parallel with the slope of the worm on the inside of the driven cylinder, or intermediately. The faces of the thrust blocks which come in contact with the control guide may be provided with rollers balls or the like to minimize friction.

The operation of the gear is that the teeth on the toothed sections engage in the worm successively, and if the control guide is set parallel with the plane of rotation, drive it at the speed that the ratio between the driving and the driven elements allows. If however the control guide is set parallel with the worm, the teeth of the tooth carrying sections will merely slide along the worm and no drive will take place. With the control guide in intermediate positions partial slip will take place, and so the driven element will rotate at speeds correspondingly intermediate between the full speed and zero.

It will thus be understood that the variation of speeds is exactly under control, and may be varied infinitely between the two extremes by means of the controlled slip. It will also be understood that the gear may be used as a speed varying mechanism or as a clutch, or both.

In order to cause the teeth to mesh into the worm, a spring controlled lever or the like, attached at its fixed end to the framing or casing surrounding the gear is adapted to push the teeth-carrying sections along the dovetail slides on the boss of the driving member of the gear against wedge shaped projections on the inner surface of the closed end of the driven cylinder. The wedge projections are so shaped and fixed that they correspond with the pitch of the worm, and so form a guide. The meshing of the teeth may be further facilitated by rounding or shaping the entering ends of them so as to provide a lead in.

Instead of returning the teeth-carrying sections into the proper positions for engaging the worm by means of a stationary spring controlled lever or guide, each section may be provided with a spring which tends to move the section away from the control guide and toward the wedge projections rotating with the worm. These springs of course rotate with the sections.

The control guide being in a fixed position at the end where the thrust blocks commence their contact with it, the thrust blocks are adapted to slide and be adjustable at the ends of the tooth-carrying sections so that the thrust blocks shall always enter the control area in the correct position for commencing their slide along the face of the control guide.

After the teeth of any section have meshed in the worm, the thrust block is locked to the tooth-carrying section by means of a pawl and ratchet arrangement or the like. In this manner the tooth carrying section and the thrust block act as one piece while they are in the control area.

The locking of the thrust block to the tooth-carrying section may conveniently be effected by sliding contact with an appropriately shaped path on the inside of the casing of the gear. When the blocks leave the control area, but before the teeth have unmeshed they are conveniently unlocked by a projection on the end of the control bar.

An alternative method of locking the thrust blocks to the toothed sections is to mount the roller carrier or thrust block in such a manner that the contact of the roller with the control guide brings about the locking through a rocking pawl.

After the teeth have unmeshed and are clear of the worm, the tooth-carrying sections, being free to move independently of the thrust blocks are guided into their correct positions for meshing with the worm by the spring controlled lever as above described, and the thrust blocks are directed by appropriate guides attached to the casing into the locking position.

The whole gearing is conveniently inclosed in a casing which also serves as a framing, carrying bearings for the axes of the driving and driven elements, and for taking the end thrust. The casing also serves as a reservoir in which oil can be retained to insure the efficient lubrication of the gear.

It will be obvious that alternative or equivalent methods may be employed for procuring a wedge contact, controlling the slip of same and directing the parts into position for reëngagement without departing from the spirit of my invention.

The accompanying drawings show by way of example a gear constructed according to the invention.

Figure 2:
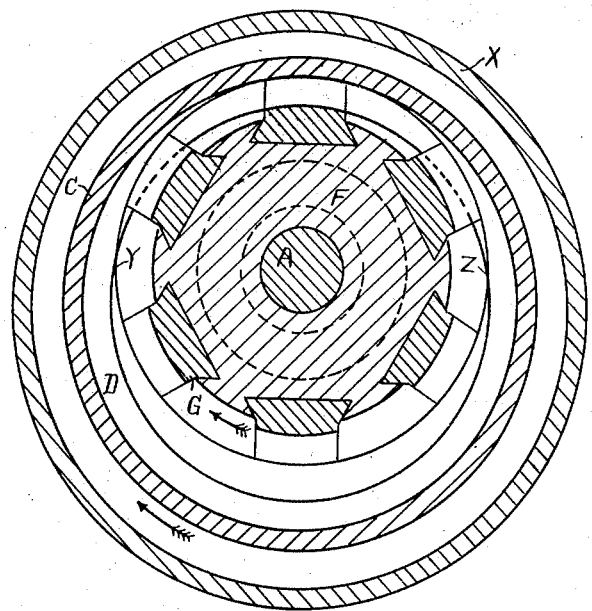

Figure 1 is a sectional elevation. Fig. 2 a cross section on line a—b in Fig. 1, Fig. 3 a cross section on line c—d in Fig. 1, Fig. 4 a diagrammatic view explaining the action of the control guide, Fig. 5 a cross section showing the mounting of a tooth-carrying slide, Fig. 6 a diagrammatic view showing the arrangement of the guide for returning the thrust blocks to the initial positions. The gear consists of two elements, the driving element connected to axle or shaft A, and the driven element, connected to axle or shaft B. The power is applied to the shaft A to drive the shaft B.

Commencing with the driven element, this consists of a hollow cylinder C with an internal worm D cut on it. The worm shown has a square thread, for instance a triple thread of half inch pitch. The worm cylinder is carried by the flanged and bossed plate E which is keyed to the driven axle B.

The driving element consists of a cylindrical boss F of smaller diameter than the cylinder of the driven element, and rotating within it. This boss is keyed to the axle A. The boss of the driving element is provided with dovetailed-grooves arranged equidistantly around the periphery. Within these dovetailed-grooves slide teeth-carrying sections G. The teeth on these sections are essentially sections of a male thread which fit the female thread or worm on the inside of the cylinder of the driven element.

The axis of the driving element is set eccentrically to the axis of the driven element, so that one side of the boss is adapted to gear into the worm on the inside of the driven cylinder through the toothed sections, while at the opposite side the teeth are clear of the worm.

The ends of the sliding teeth-carrying sections which are near the open end of the driven cylinder are provided with thrust-blocks H, which are adjustable as to their position as hereinafter described.

Carried at one end by the casing which surrounds and incloses the gear, is the control part of the gear. This consists of the guide I having a spindle 2, and which guide is curved to correspond to the circular path of the thrust-blocks and may be set by an adjusting screw 3 so that the face of it on which the thrust blocks slide is either parallel with the plane of rotation, or parallel with the slope of the worm, or intermediately. The faces of the thrust-blocks which come in contact with the control guide are provided with rollers J to minimize friction. It will readily be understood that the guide I may be adjusted by means of cams, levers or other suitable devices, instead of by means of the set screw 3.

The toothed sections engage in the worm successively, and if the control guide is set parallel with the plane of rotation, drive it at the speed that the ratio between the driving and driven elements allows. If, however, the control guide is set parallel with the worm (dotted position in Fig. 4), the teeth of the teeth carrying sections will merely slide along the worm and no drive will take place. With the control guide in intermediate positions, partial slip will take place, and so the driven element will rotate at speeds correspondingly intermediate between the full speed and zero.

It will thus be understood that the variation of the speed is exactly under control, and may be varied infinitely between the two extremes by means of the controlled slip. The drive at all speeds is perfectly positive. It will also be understood that the gear may be used either as a speed varying mechanism or as a clutch or both.

Before describing the way in which the necessary adjustments are made, to cause the teeth to mesh into the worm when they come around to meet it it will be well to point out that the driving element is in gear with the worm from the point marked Y (on Fig. 2) to the point marked Z and it should be borne in mind that for about half a revolution any given toothed section is meshing with the worm, and during the other half revolution, it is being slid into place so as to re-mesh.

In order to cause the teeth N to mesh with the worm at the point Y regardless of the relative longitudinal movement of the slide-blocks G, I provide an arc-shaped guide K supported by bolts 5, 5, to push the teeth carrying sections back along their slots. This guide is made in two sections, the end L thereof is provided with a spindle 9, about which it is adapted to move while the axis of the other end of this member L is supported by a bolt 6, there being a spring 10 surrounding the bolt which is adapted to retain this end of the member L toward the worm or member C to push the teeth carrying sections along their guides against helical cam projections M carried by the member E, (see Fig. 1.) These wedge cams are so shaped and positioned that they correspond with the pitch of the threads of the worm to form guides for positioning the teeth on the tooth carrying sections with the teeth of the worm. The meshing of the teeth may be further facilitated by rounding or shaping the entering ends of the teeth on the sections G, as shown at N in Fig. 4, so as to provide a lead-in for the teeth. The tooth carrying sections G should slide freely in their guides to overcome friction. There is no disadvantage in this freedom between the sections and their guides, as when the teeth are in driving connection with the worm, all of the parts are wedged together so that there is no shake or back-lash.

The control guide I being in a fixed position at the pivotal end where the thrust-blocks commence their contact with it, it is necessary to provide for a relative adjustment of the thrust-blocks with regard to the slides so that they shall always enter the control area in the correct position for commencing their contact with the face of the control guide. The dove-tailing of the thrust blocks to the toothed sections is shown in Fig. 5 which is a transverse section of the end of a toothed section and thrust-block.

After the teeth of any section have meshed in the worm at Y, the thrust block is locked to the teeth carrying section, so that the toothed section and the thrust block act as one piece while they are in the driving area.

Figure 3:
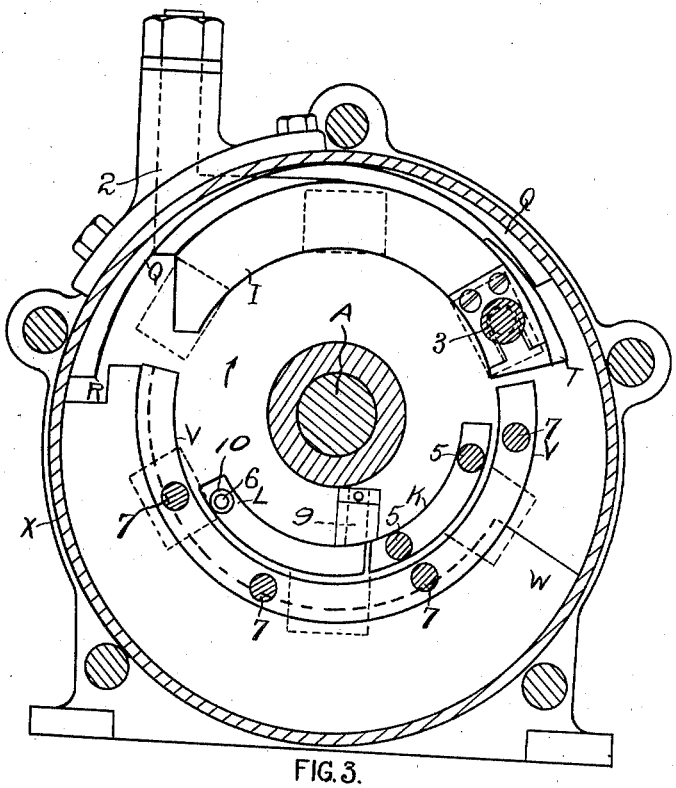

The toothed sections have a ratchet cut on them as shown at O (Fig. 1) and sliding through a hole in the thrust block is a pawl P having corresponding teeth to the ratchet. When the top of this pawl comes in contact with a path Q on the inside of the casing of the gear the teeth on the pawl are pushed into the ratchet and so the two parts are locked together. At the commencement of the path for causing the pawl to lock, a lead in is provided from R to Q (Fig. 3). The pawl is prevented from flying out under centrifugal force by a cross pin S.

Figures 4, 5, 6:
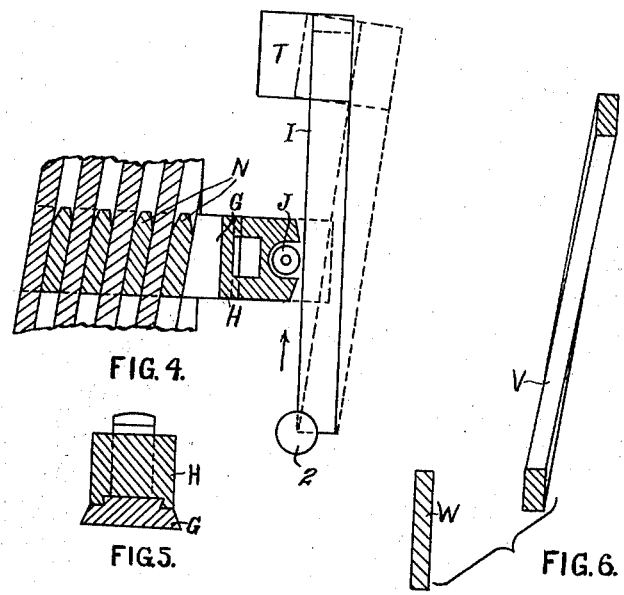

When the blocks are leaving the driving area, but before the teeth have unmeshed, the projection T at the end of the control bar, which is wedge shaped and overhanging, Figs. 3 and 4 engages the lips U of the pawls and lifts them out of engagement, thus unlocking the thrust blocks.

The thrust blocks being thus unlocked are guided into position for reëngagement by the guide V supported on the bolts 7 (Figs. 1 and 6) and fed into the control area between this guide and a plate W.

The gearing is inclosed in a casing X the end plates of which carry the bearings for the axles of the two elements. This casing will also act as an oil container, so as to insure the efficient lubrication of the gear. A ball-thrust bearing is provided at the driven end of the gear, to take the end thrust.

It will also be clear that if the control guide is set over to a position beyond that shown as parallel with the plane of rotation an increase of the speed of the driven element over that of the driving element will be obtained, but in such a case the construction of the gear would need be modified to allow of the movement of the toothed sections into the worm cylinder instead of out of it, and for returning them to their positions for remeshing.

The operation of the device is as follows: Assuming the control-guide I shifted to the position shown in Fig. 4 in which the control edge thereof is parallel with the plane of rotation, the shaft B will be rotated at the highest speed. The shaft A is continuously driven in the direction indicated by the arrows in Figs. 1, 2, 3 and 4, and the teeth on the sections G engage the threads in the worm from the point Y in Fig. 2 to the point Z, and while moving along this part of the movement, the thrust blocks are locked to the sections G, and the movements of the sections G along the shaft A are controlled by the cam I. As soon as the thrust blocks are disconnected from the sections G by the cam T, the sections G may be moved relative to the shaft A in a longitudinal direction and are moved shortly after the teeth are disengaged at the point Z by the guides K and L against the cam projections M, so as to position them with relation to the threads D for the next engagement at Y. During the passage of the thrust blocks over the cam V, the thrust blocks are moved endwise toward the plate W, which places the thrust blocks in proper position to engage the control guide I at the beginning of the engagement of the teeth. The arrangement is such that the tooth carrying sections G are all positioned with relation to the threads on the drum by the member L and the cams M just before engagement at Y, while the thrust blocks are positioned by means of the cam or plate W against which they have been forced by the cam V, so that the thrust blocks and the tooth carrying sections G are positively placed before engagement, regardless of the slip between the driving and driven member.

I claim:

1. A variable speed gear or clutch comprising driving and driven elements having engaging teeth, the teeth on one member being movable thereon, and speed controlling means for causing a definite extent of slip of one set of teeth with relation to the other set of teeth, substantially as described.

2. A variable speed gear or clutch comprising driving and driven elements having engaging teeth, the teeth on one element being a continuous thread or worm, while the teeth on the other element are arranged upon sections adapted to move axially, and means for causing a definite movement of the sections axially on its supporting members to vary the extent of slip between the teeth of one member and the teeth of the other, substantially as described.

3. In a device of the character described, a drum having internal screw-threads thereon, a second drum within the first drum, the axis of rotation of the second drum being eccentric to the axis of the rotation of the first drum, a plurality of blocks slidably mounted on the second drum and arranged to slide longitudinally thereon, said blocks each having a plurality of teeth adapted to intermesh with the teeth on the drum, the inner drum being considerably smaller in diameter than the outer drum, so that the teeth only intermesh during a portion of their rotation, cams carried by the outer drum for positioning the teeth on the inner drum at the point of engagement of the teeth, and means for controlling the axial movement of the teeth along the inner drum while the teeth are in mesh, substantially as described.

4. A device of the character described comprising a rotatable drum having internal threads thereon, an internal drum within the external drum of smaller diameter, the axis of rotation of the two drums being eccentric to each other, slide-blocks on the inner drum having teeth thereon arranged to engage the threads on the outer drum during a part of their rotation about the axis of the inner drum, cams carried by the outer drum for positioning the teeth on the inner drum at their point of engagement, spring-controlled means for retaining the slide blocks after the teeth are unmeshed, a thrust block carried by each of the slide blocks, means for locking and unlocking the thrust blocks with their respective slide blocks, means for positioning the thrust blocks with relation to the slide blocks before the thrust blocks are locked to the slide blocks, and means for controlling the movement of the thrust blocks and slide blocks longitudinally with relation to the axis of the drums when the teeth on the slide blocks are in mesh with the threads on the outer drum, to vary the slip between the two members, substantially as described.

5. In a device of the character described, the combination of intermeshing gear members, one of which is eccentric to the axis of the other member, one of said members having slide-blocks thereon provided with teeth arranged to mesh with the teeth on the other member during a portion of their rotation, means on the one member for positioning the slide-blocks to cause the teeth thereon to intermesh with the teeth on the other member at the point of entrance, and means for causing the slide-blocks to move longitudinally of the axis of the members during the time the teeth are in mesh, to vary the slip between the two members, substantially as described.

In testimony whereof I have signed by name to this specification in the presence of two subscribing witnesses.

WILLIAM JOHN GEE.

Witnesses:
S. SORM,
A. M. YOVEY.